United States Patent Office 3,077,354
Patented Feb. 12, 1963

3,077,354
STEERING MECHANISM FOR TRUCK
Alexis Rateau, 10 Avenue Elisée-Reclus, Paris, France
Filed Dec. 21, 1959, Ser. No. 861,055
Claims priority, application France Dec. 23, 1958
4 Claims. (Cl. 280—99)

The present invention relates to a steering mechanism and has specific reference to a mechanism for steering the wheels of a vehicle whereby both wheels or wheel assemblies of at least one train of wheels may be given a differential steering necessary for the vehicle to turn without any excessive wheel slippage, and means whereby all the wheels of the vehicle may be directed with their planes at right angles to the longitudinal axis of the vehicle so that the latter may be moved in this perpendicular direction.

A mechanism of the character broadly set forth hereinabove is advantageous in that is permits the normal operation of the vehicle attended by the differential steering of the wheels in curves and, in addition, when certain manoeuvres are necessary, this mechanism permits the displacement of the vehicle in a direction at right angles to its longtudinal axis. This possibility is particularly useful for parking a vehicle between two already parked vehicles when the interval available is very short. A typical case of this kind is represented by material-handling or lift trucks, operated in the vicinity of unloading quays, which are moved firstly with their longitudinal axis parallel to the quay and then at right angles to the quay in order to approach as much as possible the unloading area between other, previously aligned trucks.

It is the essential object of this invention to provide a steering mechanism of the type set forth hereinabove which is both very simple in design and reliable in use.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit and scope of the invention.

Figure 1:
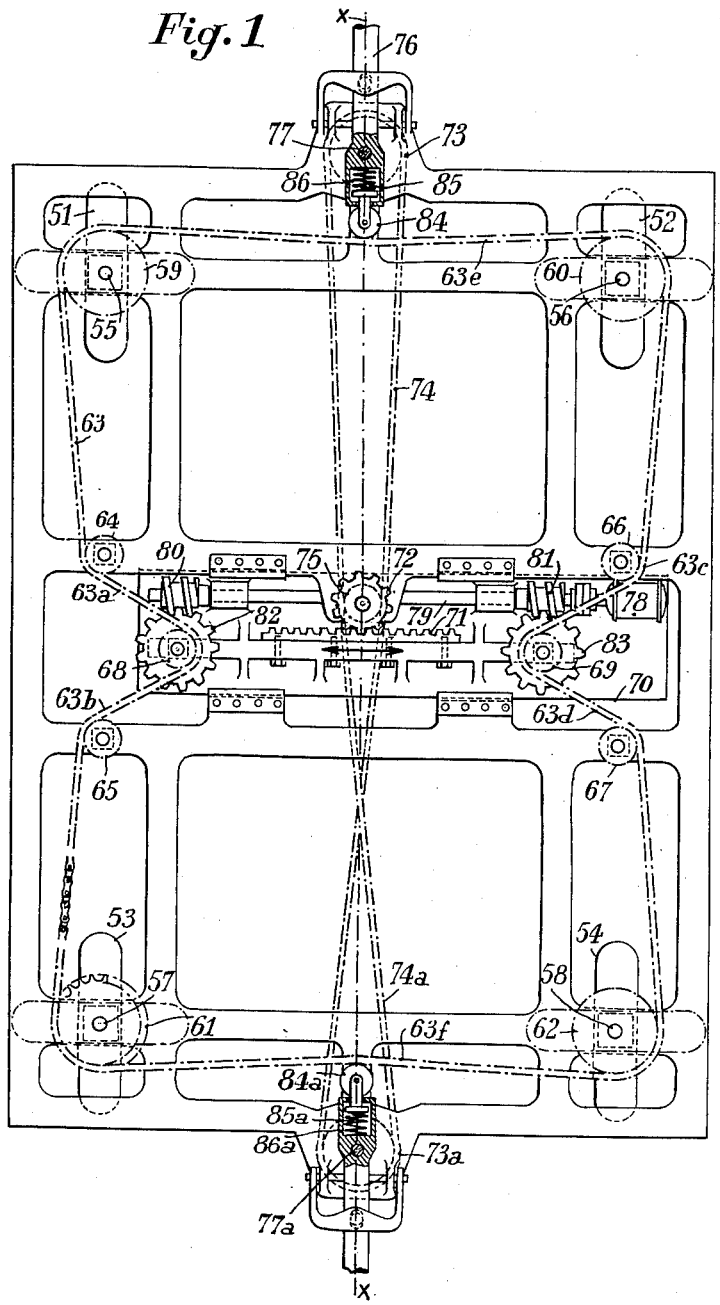
Figure 2:
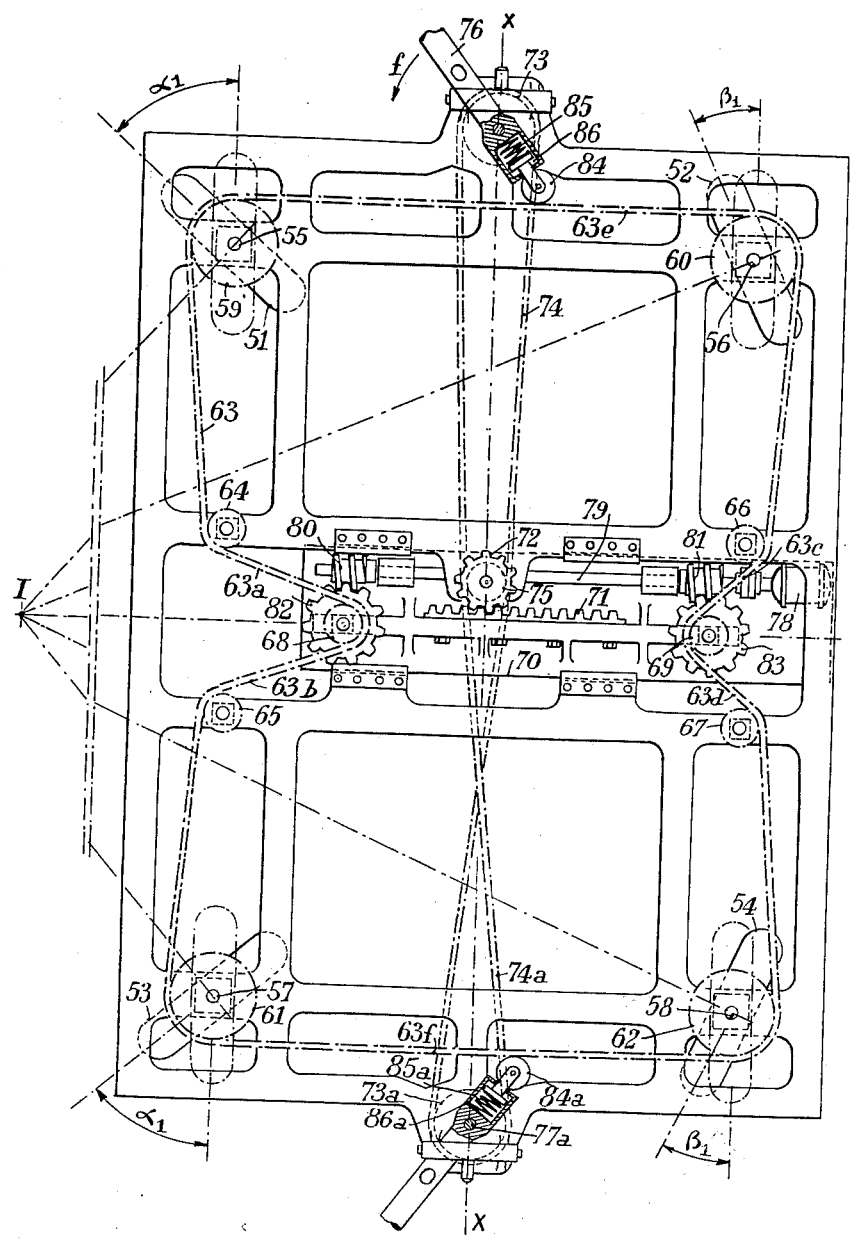

Other objects and advantages will become apparent from the following description taken in conjunction with the accompanying drawings in which:

FIGURES 1 and 2 are diagrammatic plane views showing a form of embodiment of the mechanism of this invention in two different operative positions.

In the example illustrated the vehicle comprises four wheels 51, 52, 53 and 54 pivoting about king pins 55, 56, 57 and 58, respectively, these king pins being rotatably solid with pinions 59, 60, 61 and 62, respectively. These pinions are in meshing engagement with a single driving chain 63 passing also over two pairs of idling guide pinions 64, 65, 66 and 67 having their pivot pins carried by the frame of the vehicle. The center lines of the two pairs of pinions are of same length and the pinions of each pair are aligned in a direction parallel to the longitudinal axis X—X.

The chain 63 also passes over a pair of return pinions 68, 69, displaceable in the transverse direction, although the relative spacing of these pinions 68 and 69 is constant.

In the form of embodiment illustrated the pinions 64, 65 and 68 on the one hand, and 66, 67 and 69 on the other hand form two isosceles triangles disposed symmetrically in relations to the longitudinal axis X—X in the position illustrated in FIG. 1. This position corresponds to that in which the wheels 51 . . . 54 are parallel to the axis X—X.

The pivot pins of pinions 68 and 69, in this example, are supported by a carriage 70 on which a rack 71 is secured. A pinion 72 meshing with this rack is rigidly secured to a gear-reducing pinion 75 which is driven from another pinion 73 through the chain 74, as shown. The aforesaid pinion 73 is driven in turn by the steering member 76 pivoted at 77 on the frame of the vehicle.

The movable carriage 70 carries on the other hand a prime mover or motor 78, the output shaft 79 of which carries a pair of worms 80, 81 in meshing engagement with worm gears 82, 83 respectively, rigid with the pivot pins of the aforesaid pinions 68 and 69.

The device illustrated in FIGS. 1 and 2 of the drawings operates as follows:

When the vehicle is running straight ahead, that is, in the direction of its longitudinal axis X—X, the wheels are set as illustrated in FIG. 1. Assuming that the vehicle is turning from the straight to the left, as shown in FIG. 2, the steering member 76 will pivot in the direction of the arrow $f$. As a consequence, a displacement of the rack 71 and therefore of the carriage 70 is produced through the medium of the transmission 73, 74, 75 and 72.

Due to the displacement of pinions 68 and 69 to the right, the isosceles triangles consisting of the axes of pinions 64, 65, 68 and 66, 67 and 69 will undergo a deformation. The height of the first triangle increases while that of the other one decreases. As a result, the spans 63a and 63b of chain 63 extending respectively between the pinions 64—68 and 65—68 are elongated while the spans 63c and 63d extending respectively between the pinions 66—69 and 67—69 are shortened.

Now it appears that due to the geometrical disposition of the pinions the increase in length of the chain spans 63a and 63b, for a given movement of the carriage 70 to the right, is greater than the decrease in length of the spans 63c and 63d. Consequently, the pinions 59 and 61 rigid with wheels 51 and 53 are rotated through an angle $\alpha_1$ greater than the angle $\beta_1$ through which the pinions 60 and 63 respectively rigid with wheels 52 and 54 are rotated.

The difference between the angles $\alpha_1$ and $\beta_1$ is such that, as shown in FIG. 2, the axes of rotation of the wheels or, in other words, the perpendiculars to the vertical planes of these wheels converge to a common instantaneous centre of rotation I.

Since the wheels of a same train of wheels, that is, 51, 52 and 53, 54 pivot through different angles, the spans 63e and 63f of the chain which extend respectively between the wheels 51, 52 and 53, 54 should have a certain slack in the position shown in FIG. 1. This slack is reduced when the vehicle is turning, as shown in FIG. 2.

In order properly to tension the chain 63 in all operating conditions, chain-tighteners acting upon the spans 63e and 63f are provided. The upper chain-tightener illustrated in the drawings may consist of a jockey pulley 84 urged by a spring 85 against the span 63e of the chain. The spring 85 is enclosed in a case 86 rigid with the steering member 76.

Consequently, the jockey pulley 84 follows the movements of the steering member 76 and tends to move gradually away from the span 63e as the slack therein tends to decrease.

A similar device 84a, 85a, 86a carried by the pinion 73a is provided for properly tensioning the lower span 63f in FIGS. 1 and 2 and is rotatably driven from the pinion 75 through the chain 74a.

When it is desired to cause the wheels of the vehicle to pivot to a position in which their planes are disposed at right angles to the longitudinal axis X—X, the prime mover or motor 78 is operated. The output shaft 79 of the prime mover or motor 78, which carries the worms 80 and 81, drives the worm gears 82, 83 and therefore the guide pinions 68 and 69 of the chain. As a result the chain 63 is driven and causes the simultaneous rotation of wheels 51 ... 54. The four wheels rotate about the axis of their swivel or king pins and remain parallel, until they are set at right angles to the longitudinal axis X—X.

The form of embodiment just described is advantageous in that it permits of displacing the carriage in any direction defined by the angular setting of the wheels, due to the possibility of maintaining these wheels parallel to one another.

The driving device or prime mover 78 may consist of a handwheel or a motor associated with a reduction gear and energized from a source of power carried by the vehicle or disposed externally thereto. It is also adapted to drive the chain through one or more sprockets carried by the frame of the vehicle and disposed at any points along the path of the chain.

Although in the example described with reference to FIGS. 1 and 2 the movable guide pinions 68 and 69 are carried by the same carriage 70, it would not constitute a departure from the principles of this invention to provide a separate control member for actuating each of these pinions, provided that their relative spacing be constant.

Furthermore, each pinion 68 and 69 may be replaced if desired by a train of guide or return pinions, each train being displaceable in a transverse direction under the same conditions.

Finally, it will be readily understood by anybody conversant with the art that many modifications and alterations may be brought to the forms of embodiment shown and described hereinabove by way of example, without departing from the spirit and scope of the invention as set forth in the appended claims.

What I claim is:

1. A mechanism for steering the wheels of a vehicle, notably a freight truck, whereby the swivel pins of the wheels may be given a differential steering as required for turning without any excessive slippage of the wheels, and whereby all the wheels of the vehicle may also be set at right angles to the longitudinal axis of the vehicle with a view to move the vehicle in this perpendicular direction, this mechanism comprising pinions coaxially rigid with the swivel pins of the wheels of the vehicle respectively, a single driving chain in constant meshing engagement with all of said pinions, means for driving said chain and therefore produce the simultaneous rotational movement of said pinions and therefore of all the wheels of the vehicle until they are set at right angles to the longitudinal axis of the vehicle, two pairs of fixed guide pinions, which are mounted on the frame of the vehicle and aligned in a longitudinal direction, the chain that drives the pinions rigid with the swivel pins of the wheels passing over said guide pinions, said guide pinions being disposed on either side of the longitudinal axis of the vehicle, the relative spacing of the two pinions of each pair being equal, at least one transversely movable guide pinion associated with each pair of said fixed guide pinions, said chain also passing over said transversely movable pinion, said movable guide pinions being held at a constant relative spacing, means being also provided for displacing in a transverse direction said movable guide pinions, whereby the lengths of the spans of the chain which interconnect said fixed guide pinions and said movable guide pinions vary in opposite directions when said movable pinions are displaced in the transverse direction, the chain spans that extend from one pair of fixed pinions being elongated or shortened according to the direction of movement of said movable guide pinions, whereas the variations in length of said two pairs of spans differ, so that the wheels of a same train of wheels may rotate through different angles.

2. A mechanism for steering the wheels of a vehicle, notably a freight truck, whereby the swivel pins of the wheels may be given a differential steering as required for turning without any excessive slippage of the wheels, and whereby all the wheels of the vehicle may also be set at right angles to the longitudinal axis of the vehicle with a view to move the vehicle in this perpendicular direction, this mechanism comprising pinions coaxially rigid with the swivel pins of the wheels of the vehicle respectively, a single driving chain in constant meshing engagement with all of said pinions, means for driving said chain and therefore produce the simultaneous rotational movement of said pinions and therefore all the wheels of the vehicle until they are set at right angles to the longitudinal axis of the vehicle, two pairs of fixed guides pinions, which are mounted on the frame of the vehicle and aligned in a longitudinal direction, the chain that drives the pinions rigid with the swivel pins of the wheels passing over said guide pinions, said guide pinions being disposed on either side of the longitudinal axis of the vehicle, the relative spacing of the two pinions of each pair being equal, at least one transversely movable guide pinion associated with each pair of said fixed guide pinions, said chain also passing over said transversely movable pinion and forming the equal sides of two deformable isosceles triangles, the vertices of said triangles which form the bases thereof consisting of the two pairs of fixed guide pinions, the bases of said two isosceles triangles being symmetric with respect to the longitudinal axis of the vehicle, whereas the third vertex of each triangle consists of the axis of a guide pinion movable in a direction perpendicular to the longitudinal axis, the relative spacing between the movable guide pinions of each triangle being constant, means being also provided for displacing in a transverse direction said movable guide pinions, whereby the lengths of the spans of the chain which interconnect said fixed guide pinions and said movable guide pinions vary in opposite directions when said movable pinions are displaced in the transverse direction, the chain spans that extend from one pair of fixed pinions being elongated or shortened according to the direction of said movable guide pinions, whereas the variations in length of said two pairs of spans differ, so that the wheels of a same train of wheels may rotate through different angles.

3. A mechanism for steering the wheels of a vehicle, notably a freight truck, whereby the swivel pins of the wheels may be given a differential steering as required for turning without any excessive slippage of the wheels, and whereby all the wheels of the vehicle may also be set at right angles to the longitudinal axis of the vehicle with a view to move the vehicle in this perpendicular direction, this mechanism comprising pinions coaxially rigid with the swivel pins of the wheels of the vehicle respectively, a single driving chain in constant meshing engagement with all of said pinions, means for driving said chain and therefore produce the simultaneous rotational movement of said pinions and therefore of all the wheels of the vehicle until they are set at right angles to the longitudinal axis of the vehicle, two pairs of fixed guide pinions, which are mounted on the frame of the vehicle and aligned in a longitudinal direction, the chain that drives the pinions rigid with the swivel pins of the wheels passing over said guide pinions, said guide pinions being disposed on either side of the longitudinal axis of the vehicle, the relative spacing of the two pinions of each pair being equal, at least one transversely movable guide pinion associated with each pair of said fixed guide pinions, said chain also passing over said trnasversely movable pinion and forming the equal sides of two deformable isosceles triangles, the vertices of said triangles which form the bases thereof consisting of the two pairs of fixed guide pinions, the bases of said two isosceles triangles being symmetric with respect to the longitudinal axis of the vehicle, whereas the third vertex of each triangle consists of the axis of a guide pinion movable in a direction perpendicular to the longitudinal axis, the relative spacing between the movable guide pinions of each triangle being constant, means being also provided for displacing simultaneously the two movable guide pinions in a transverse direction in order to produce the variation, in opposite directions, of the heights of said two isosceles triangles whereby the variations in length of the chain spans which form the two equal sides adjacent to the movable vertices of said triangles produce linear displacements of the chain which have different amplitudes over the pinions rigid with the swivel pins of the wheels so that the wheels of a same train of wheels will rotate through different angles.

4. A mechanism for steering the wheels of a vehicle, notably a freight truck, whereby the swivel pins of the wheels may be given a differential steering as required for turning without any excessive slippage of the wheels, and whereby all the wheels of the vehicle may also be set at right angles to the longitudinal axis of the vehicle with a view to move the vehicle in this particular direction, this mechanism comprising pinions coaxially rigid with the swivel pins of the wheels of the vehicle respectively, a single driving chain in constant meshing engagement with all of said pinions, means for driving said chain and therefore produce the simultaneous rotational movement of said pinions and therefore of all the wheels of the vehicle until they are set at right angles to the longitudinal axis of the vehicle, two pairs of fixed guide pinions, which are mounted on the frame of the vehicle and aligned in a longitudinal direction, the chain that drives the pinions rigid with the swivel pins of the wheels passing over said guide pinions, said guide pinions being disposed on either side of the lingitudinal axis of the vehicle, the relative spacing of the two pinions of each pair being equal, at least one transversely movable guide pinion associated with each pair of said fixed guide pinions, said chain also passing over said transversely movable pinion, said movable guide pinions being held at a constant relative spacing, means for displacing in a transverse direction said movable guide pinions, whereby the lengths of the spans of the chain which interconnect said fixed guide pinions and said movable pinions vary in opposite directions when said movable pinions are displaced in the transverse direction, the chain spans that extend from one pair of fixed pinions being elongated or shortened according to the direction of movement of said movable guide pinions, whereas the variations in length of said two pairs of spans differ, so that the wheels of same train of wheels may rotate through different angles, and means for compensating the variation in length of said chain between the wheels of the same train and for constantly maintaining a proper tension of said chain, said last named means comprising a socket pivoting on the frame of the vehicle as a function of the displacement of said steering member, a roller in contact with variable-tension spans of said chain, said roller being resiliently mounted in said socket so that the roller will exert a substantially constant pressure on said chain.

References Cited in the file of this patent

UNITED STATES PATENTS

| | | |
|---|---|---|
| 1,382,909 | Hennessy et al. | June 28, 1921 |
| 2,470,496 | Krilanovich | May 17, 1949 |
| 2,631,045 | McElhinney et al. | Mar. 10, 1953 |
| 2,875,842 | Morrell | Mar. 3, 1959 |
| 2,901,265 | Knight et al. | Aug. 25, 1959 |

FOREIGN PATENTS

| | | |
|---|---|---|
| 1,073,808 | France | Mar. 24, 1954 |